United States Patent [19]

Siviglia

[11] Patent Number: 4,787,732

[45] Date of Patent: Nov. 29, 1988

[54] CONTACT LENS AND METHOD OF MAKING SAME

[76] Inventor: Nick Siviglia, c/o Lancaster Contact Lens, Inc., 700 Eden Rd., Lancaster, Pa. 17601

[21] Appl. No.: 135,577

[22] Filed: Dec. 21, 1987

Related U.S. Application Data

[63] Continuation of Ser. No. 856,077, Sep. 24, 1986, abandoned.

[51] Int. Cl.$^4$ .......................... G02C 7/04; B24B 1/00
[52] U.S. Cl. ............................ 351/160 R; 51/284 R; 351/177
[58] Field of Search ............... 351/160 R, 160 H, 161, 351/162, 177; 51/284 R

[56] References Cited

U.S. PATENT DOCUMENTS 4,193,672  3/1980  Trombley et al. ............... 351/160 R
4,575,205  3/1986  Rappazzo ....................... 351/160 R X Primary Examiner—John K. Corbin
Assistant Examiner—Scott J. Sugarman
Attorney, Agent, or Firm—Panitch Schwarze Jacobs & Nadel

[57] ABSTRACT

A contact lens is provided for the eye of a patient with a cornea having a central surface. The contact lens includes a posterior surface which includes an innermost or generally flat circular first zone having a diameter which is at least 0.5 mm greater than the greatest dimension of the central corneal surface. The radius of curvature of the first posterior surface is at least as small as that of the central corneal surface. A generally annular second posterior zone extends radially beyond the first zone, the second zone having a radius of curvature less than the radius of curvature of the first posterior zone and generally corresponding to the curvature of the corneal surface surrounding the central corneal surface. In one embodiment, a generally annular third peripheral zone preferably extends radially beyond the second zone and outwardly from the corneal surface to facilitate circulation of fluid between the contact lens and the cornea. The anterior surface of the lens includes a first generally circular corrective zone for correcting the patient's vision and a second generally annular zone extending radially beyond the corrective zone and generally paralleling the second posterior zone.

18 Claims, 2 Drawing Sheets

CONTACT LENS AND METHOD OF MAKING SAME

This is a continuation of U.S. patent application Ser. No. 856,077 filed Apr. 24, 1986, now abandoned.

BACKGROUND OF THE INVENTION

The present invention relates generally to contact lenses and, more particularly, to a contact lens having a generally flat central posterior surface and to a method of making such a contact lens.

Approximately 10 to 15 years ago a surgical procedure was developed in the Soviet Union and in Columbia for correcting myopia. This procedure, radial keratonomy, involves making multiple radial incisions through four of the five layers of a patient's cornea which cause the central portion of the normally spherical cornea to deflate and flatten. When successful, the procedure reduces the effective power of the eye as a lens, increasing the visual acuity of the myopic patient. Successfully treated patients no longer require eye glasses or contact lenses to correct their myopia.

Myopia is generally regarded not as a disease but rather as an inherited trait or congentital defect. Radial keratonomy is usually regarded as a cosmetic procedure rather than as treatment for a disease. It is an elective procedure which often permits the patient to dispense with both the eye glasses which the patient may regard as unattractive and with the discomfort and inconveniences sometimes associated with wearing contact lenses.

Unfortunately, the the radial keratonomy procedure is not a unmitigated success in every case. Radial keratonomy does not correct astigmatism which is associated with asymmetry of the posterior surface of the cornea or asymmetry of the crystalline lens. Further, the radial keratonomy procedure may result in instability of the central portion of the cornea causing the patient's visual acuity to vary from hour to hour during the day as the radius of curvature of the central portion of the cornea changes. While astigmatism of a patient who has undergone radial keratonomy can be corrected with eye glasses, this approach to treatment is highly impractical for the patient suffering from corneal instability. Such a patient would require several pairs of glasses to see correctly throughout the day due to the variations in visual acuity.

Other types of surgical procedures such as penetrating keratoplasty (corneal transplant used in treating corneal disease) or corrective surgery for Fuchs corneal dystrophy may also result in a centrally flattened cornea. Patients with corneas having a surgically flattened central surface generally cannot be well fit with prior art corrective contact lenses.

Thus, there is a need for a device or method which can correct the problems associated with the corneal instability which sometimes occurs after radial keratonomy. Further, there is a need for a contact lens which can correct conditions which reduce visual acuity such as astigmatism which are not successfully treated by the radial keratonomy procedure, or which remain after or result from other surgical procedures such as penetrating keratoplasty.

Prior art contact lenses, which typically have a generally concave posterior surface, cannot be successfully fitted to or be worn by the radial keratonomy patient. For example, if the posterior surface of the contact lens is fit to the generally normal portion of the cornea surrounding the flat central surface, a hard or gas permeable contact lens will cause trauma and swelling of the cornea. However, if the posterior surface of a prior art hard or gas permeable contact lens is fit to the central surface of the cornea, the contact lens will be unstable and will tend to ride up or down, lift off and irritate the cornea.

Further, if the posterior surface of a large soft lens is fit to the normal portion of the cornea surrounding the central flat corneal surface, the lens will tend to buckle proximate the central surface of the cornea, resulting in poor vision and symptoms indicating the lens fits the cornea too tightly. If the patient is fitted with a scleral or haptic lens of traditional design, air bubbles will tend to form under the lens proximate the central portion of the cornea and the lens will feel too tight even if the lens is provided with holes for tear flow. In short, traditional lens designs do not meet the requirements of a patient who has undergone radial keratonomy.

The present invention meets the needs of these patients. The present invention provides a contact lens which can be worn by the patient suffering from corneal instability following radial keratonomy. Similarly, the lens of the present invention can be worn by the radial keratonomy patient who seeks to improve his or her appearance by wearing contact lenses rather than eye glasses to correct astigmatism and other visual acuity defects uncorrected by the surgical procedure.

The present invention also provides a contact lens which may be fitted to a cornea having a generally flat central anterior surface resulting from other surgical procedures, such as corneal transplants used in treating corneal disease, in addition to radial keratonomy.

SUMMARY OF THE INVENTION

Briefly stated, the present invention comprises a contact lens for the eye of a patient with a cornea having a central surface the lens having a posterior surface including a generally flat circular first zone. This first posterior zone has a diameter which is at least about 0.5 mm greater than the greatest dimension of the central corneal surface and a radius of curvature at least as small as the radius of curvature of the central corneal surface.

A second generally annular zone extends radially beyond the first posterior zone and has a radius of curvature less than the first posterior zone. The radius of curvature of the second posterior zone corresponds to the curvature of the corneal surface surrounding the central corneal surface.

In a preferred embodiment, a third generally annular peripheral zone extends radially beyond the second posterior zone. The radially outer end of the peripheral zone extends outwardly from the corneal surface to facilitate circulation of oxygen and tear fluid between the contact lens and the cornea.

The contact lens also has an anterior surface which includes a first generally circular corrective zone adapted to correct a patient's vision. The anterior surface also includes a second generally annular zone extending radially beyond the corrective zone and generally paralleling the second posterior zone. Preferably, the diameter of the first anterior zone is about the same as the diameter of the first posterior zone.

The present invention also includes a method for making the above-described lens which includes the steps of establishing the size, position and topography of the central surface of the cornea and the surrounding corneal surface proximate thereto. The patient is refracted to determine the required presciption and a contact lens having posterior and anterior surfaces as described above is fabricated in accordance with the prescription.

BRIEF DESCRIPTION OF THE DRAWINGS

The foregoing summary, as well as the following detailed description of preferred embodiments of the invention will be better understood when read in conjunction with the appended drawings, it being understood, however, that this invention is not limited to precise arrangements illustrated. In the drawings.

DESCRIPTION OF THE PREFERRED EMBODIMENTS

Figure 1:
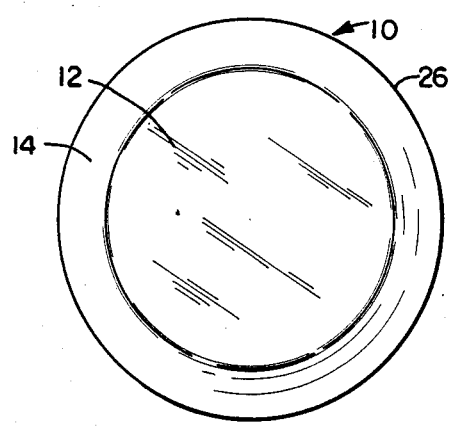
FIG. 1 is a top plan (anterior) view of a contact lens in accordance with one presently preferred embodiment of the present invention.
Figure 2:
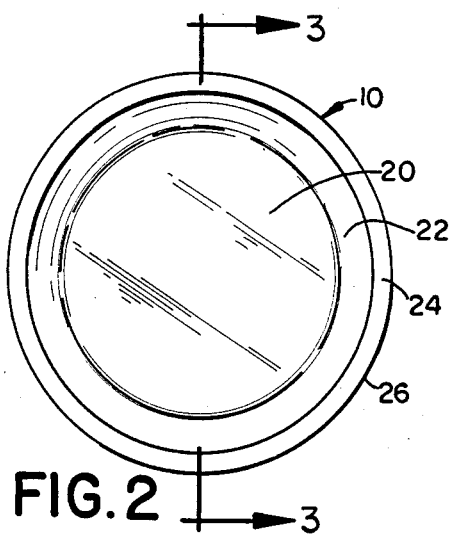
FIG. 2 is a bottom plan (posterior) view of the lens of FIG. 1.

Referring to the drawings wherein like numerals indicate like elements throughout the several views, and particularly to FIGS. 1 and 2, it can be seen that the present invention comprises a corneal contact lens 10. The lens 10 can be fabricated from any suitable stable contact lens material such as polymethylmethacrylate. Good results have been obtained using an oxygen-permeable silicone material. It should be understood that even though the above-mentioned silicone material has been found to be successful, the present invention is not limited to a particular lens material or group of materials.

Figure 3:
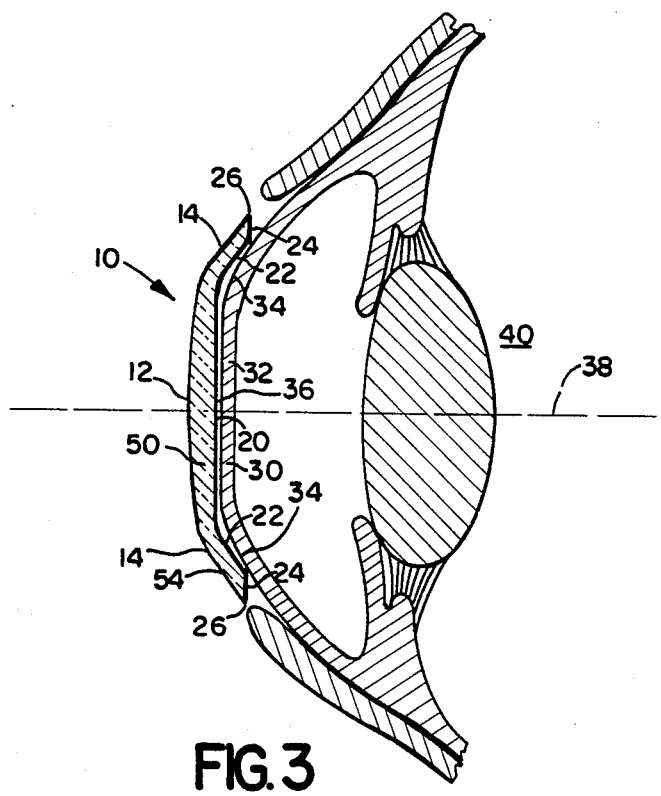
FIG. 3 is a sectional view of the lens of FIG. 2 taken along the lines 3—3 and showing the lens in position associated with the cornea of a patient.

FIG. 3 is a partial sectional view of an eye 40 fitted with a contact lens 10 of the present invention. The eye 40 has an optic axis 38 which traverses the cornea 30 and crystalline lens 39. The cornea 30 has a generally flat central surface 32 surrounded by a corneal surface 34 having generally spherical normal corneal curvature. The flatness of the central surface 32 of the cornea 30 illustrated may be the result of radial keratonomy or another surgical procedure, such as a corneal transplant. The central surface 32 of the cornea 30 may appear generally circular when viewed from in front of the eye 40 (not shown). As shown in FIG. 3, the lens 10 is worn on the cornea 30 of the eye 40 generally centered about the optic axis 38 of the eye 40 and is separated from the central portion of the cornea 30 by a thin layer of tear fluid 36.

The lens 10 has a back or posterior surface 13 which is positioned adjacent the eye 40. The posterior surface 13 includes a generally circular central or first zone 20 at its radial center. As shown in FIG. 3, when the lens 10 is placed on the eye 40 of the patient, the first posterior zone 20 is adjacent and generally aligned with the generally flat central surface 32 of the cornea 30. The first posterior zone 20 has a diameter which is as least about 0.5 mm greater than the greatest dimension of the central corneal surface 32 to permit the lens 10 to move easily on the cornea 30.

For example, if the central corneal surface 32 is generally circular and has a diameter of about 8.5 millimeters, the first posterior zone 20 of the lens 10 should have a diameter of at least about 9 millimeters. The size of the first posterior zone 20 relative to the size of the flat central surface 32 of the cornea 30 provides a close fit to maintain the lens 10 in the proper position on the cornea 30 for improved visual acuity, yet permits limited movement of the contact lens 10 on the cornea 30, increasing the comfort of the lens 10 for the patient.

The radius of curvature of the first posterior surface 20 is at least as small as the radius of curvature of the central corneal surface 32. Thus, when the central corneal surface is generally flat, the first posterior zone 20 is also generally flat or may be slightly concave to closely correspond to the central corneal surface 32. This permits the first posterior surface 20 to closely approach the central corneal surface 32, and yet be spaced from the central corneal surface 32 by a thin layer of tear fluid 36. The close approach discourages the formation of irritating air bubbles between the corneal surface 32 and the lens 10, as sometimes encountered with use of prior art scleral or haptic lenses.

Extending radially beyond the first posterior zone 20 is a generally annular second posterior zone 22. The second posterior zone 22 has a radius of curvature which is less than the radius of curvature of the first posterior zone 20 so that it generally corresponds to the curvature of the generally normal or unchanged curved corneal surface 34 surrounding and proximate to the flat central corneal surface 32. By making the second posterior zone 22 in this manner, the second posterior zone 22 may closely approach the curved corneal surface 34 to help support the lens 10 without putting excessive pressure on the flat central corneal surface 32 which is generally more sensitive than the surrounding curved corneal surface 34.

In comparison with prior art contact lenses fitted to the flattened central surface 32 of the cornea 30 and having a posterior surface having a single radius of curvature, the lens 10 of the present invention is more securely positioned on the cornea 30. The second posterior zone 22 discourages slippage of the lens 10 from its fitted position on the cornea 30. For example, slippage of the lens 10 in the nasal direction is discouraged by contact of the temporally positioned portion of the second posterior zone 22 with the corneal surface.

The annular width of the second posterior zone 22 depends upon the individual patient, the relative size of the cornea 30 and of the central flat surface of the cornea 32, and the angle between the central flat surface 32 and the surrounding normal corneal surface 34. Preferably, the annular width of the second posterior zone is at least great enough to discourage slippage of the lens 10 and is preferably from about 0.05 mm to 1.5 mm. In one presently preferred embodiment of the present invention, the reciprocal of the radius of curvature of the second posterior zone 22 is about 1.5 diopters greater than the reciprocal of the radius of curvature of the first posterior zone 20. Thus, the second posterior zone 22 has greater curvature than the first posterior zone 20, and slippage of the lens 10 so formed on the cornea 30 is discouraged.

When the lens 10 is formed from a relatively soft, hydrophilic material, the annular width of the second posterior zone is preferably greater than that employed when a hard less material such as polymethylmethacylate or glass is used. For example, the annular width may be great enough so that the lens extends beyond the cornea 30 to the haptic zone of the eye (not illustrated).

The generally normal corneal surface 34 which surrounds the central corneal surface 32 approximates a portion of a spherical surface, because the normal cornea itself approximates a portion of a spherical surface. The second posterior zone 22 which confronts the generally normal corneal surface 34 may be formed to be a generally annular portion of a spherical surface. In this embodiment, further described below, the second posterior zone 22 curves radially as well as perpendicularly to the radius of the lens 10.

In another embodiment, also further described below, the second posterior zone 22 forms an annular portion of a conical surface which approximates the curvature of the confronting normally spherical surface 34 of the cornea. When the radial width of the second posterior zone 22 is relatively small, this approximation is good. When the annular width of the second posterior zone 22 is relatively large, the approximation becomes less accurate. In this case it may be desirable to form the portion of the posterior surface extending between the first posterior zone 20 and the edge 26 of the lens 10 from a series of concentric annular posterior surfaces, each being a portion of a conical surface characterized by a different cone angle. This series of concentric annular posterior surfaces more closely approximates the spherical corneal surface, thus providing a better fit.

In addition, it is believed that the additional concentric annular posterior surfaces encourage the formation of a tear layer or "reservoir" which is relatively thick in comparison with lenses formed without the additional posterior surfaces. The tear "reservoir" is believed to serve as a source of dissolved oxygen and fluid lubricant for the central flat surface 32 of the cornea 30.

In one presently preferred embodiment of the invention, extending radially beyond the second posterior zone 22 is a generally annular third or peripheral posterior zone 24. The radially outer end of the peripheral zone 24 extends generally outwardly from the corneal surface to facilitate circulation of fluids such as oxygen, tear fluid and wetting solution between the contact lens 10 and the cornea 30 as illustrated in FIG. 3. However, the lens 10 may be fabricated having only first and second posterior zones.

The peripheral posterior zone may be formed using a standard sequence of spherical tools. For example, tools having curvatures of 26, 34 and 37 diopters may be used. Preferably, such a sequence of peripheral curves is blended to give a smooth surface. The peripheral curve or curves can be selected to fit the individual patient.

The annular width of the third posterior zone 24 is sufficiently great so that the lens 10 may be easily removed manually by grasping the edge 26 of the lens 10 and sliding the lens 10 off the cornea 30. In one presently preferred embodiment, the reciprocal of the radius of curvature of the third posterior zone 24 is greater than the reciprocal of the radius of curvature of the second posterior zone 22. For example, the reciprocal of the radius of curvature of the third posterior zone 24 may be about 3.0 diopters greater than the reciprocal of the radius of curvature of the second posterior zone 22. The lesser curvature of the third posterior surface 24, in comparison with the second posterior surface 22, also facilitates the circulation of fluids such as oxygen, tear fluid, wetting solution and the like, and permits the lens 10 to be easily placed on and removed from the cornea.

The anterior surface 11 of the lens 10 includes a first generally circular corrective zone 12 which has been fabricated in accordance with the particular needs of the individual patient to improve visual acuity or to otherwise correct the patient's vision. The first anterior zone 12 preferably has a diameter which is about the same as the first posterior zone 20 of the lens 10. In this manner, the first anterior zone 12 and the first posterior zone 20 cooperate to provide a corrective lens segment 50 which is adapted for improving or correcting the vision of the patient.

A second generally annular anterior surface 14 extends radially beyond the corrective zone 12 to the outer edge 26 of the lens 10. The second posterior zone 22 and the portion of the second anterior zone 14 opposite to the second posterior zone 22 together comprise opposing surfaces of a generally annular plano lens segment 52. Because the plano lens segment 52 is adjacent the normal corneal surface 34, optical correction may not be desired or necessary and consequently a plano or "window glass" segment may be employed. The plano lens segment 52 discourages slippage of the lens 10 on the cornea 30, as discussed above. Further, the plano lens segment 52 reduces bulk and eye irritation relative to lenses having a non-plano annular segment surrounding the corrective zone 12.

The third posterior zone 24 and the portion of the second anterior zone 14 opposing the third posterior zone 24 together comprise a generally annular peripheral lens segment 54. Because the annular width of the peripheral lens segment 56, which is determined by the annular width of the third posterior zone 24, is relatively small, the optical effect of the peripheral lens segment 56 on the visual acuity of the patient is also relatively small.

In the cases of certain patients it may be desirable to provide a plano and/or peripheral segment which is relatively thick. For example, when it is desirable for the upper eye lid to assist in holding the lens 10 on the cornea 30, a relatively thick peripheral segment 56 may be used (not illustrated). In this case, the second anterior zone 14 of the lens may be varied to provide a thickened annular lens segment.

The edge 26 of the lens 10 may be of a standard design known in the art. Preferably, the edge design provides a smoothly tapering extremity on the periphery of the lens 10 which is neither excessively sharp or blunt.

In one presently preferred embodiment of the present invention illustrated in FIG. 4d and discussed further below, the posterior surface 13 of the contact lens 10 further includes at least one additional generally annular zone intermediate the first posterior zone 20 and edge 26 of the lens 10. In the alternative, the radius of curvature of the posterior surface 13 of the lens 10 may continuously vary along a meridian traversing the posterior surface 13 from the central posterior zone 20 to edge 26 of the lens 10 so that the second posterior zone 22 forms a portion of a spherical surface.

The additional annular zone or zones intermediate the first posterior zone 20 and the edge 26 of the lens 10 may provide a better fit to the cornea of some patients by closely approaching the corneal surface adjacent thereto. For example, the fit may be improved in patients having a cornea in which the boundary between the central corneal surface 32 and the surrounding normal corneal surface 34 is not sharply defined Alternatively, when the annular width of the second posterior zone 22 is relatively great, the additional concentric annular zones may provide a better fit.

Further, in the embodiment of the present invention in which the curvature of the annular posterior surface surrounding the first posterior zone 20 changes continuously in the radial direction, the radial curvature is preferably selected to approximate the generally normal surface 34 of the cornea surrounding the corneal central surface 32, which itself is a portion of a generally spherical surface, thus providing a better fit of the lens 10 to the eye 40.

Because the first posterior zone 20 of the lens confronts and generally conforms to the shape of the central flat surface 32 of the cornea 30 across a narrow gap of tear fluid 36, the lens 10 confers mechanical stability on an otherwise unstable cornea 30. This result has not heretofore been achieved.

As discussed above, those prior art hard or gas permeable contact lenses which typically have a generally concave posterior surface and are fit to the flattened central surface of the cornea tend to ride up or down on the cornea, lift off and otherwise irritate the cornea particularly the sensitive flat central surface 32. Similarly, if this same type of prior art lens is fitted instead to the generally normal portion of the cornea surrounding the flat central surface, the lens may cause trauma and swelling of the cornea. Further, if a soft prior art lens having a generally concave posterior surface is fitted to the normal portion of the cornea surrounding the central surface, the lens will tend to buckle proximate the central surface of the cornea, resulting in poor vision and symptoms of too tight a fit. Scleral or haptic lenses of traditional design are similarly unsuccessful, in that air bubbles tend to form proximate the central portion of the cornea and the lens will tend to feel too tight.

Further, the anterior surface of the contact lens 10 may be formed to correct astigmatism and other characteristics of ametropic and presbyopic eyes which are not correctible by radial keratonomy. For example, toric or bitoric lenses with or without prism may be prepared according to the present invention.

To make or fit a contact lens 10 of the present invention, the exact position, size and topography of the central surface 32 of the cornea 30 is established through the use of any known technique, for example slit lamp biomicroscopy and/or topography studies. For example, a very small, thin contact lens or test lens (not illustrated) having a diameter which is smaller than the diameter of the central flat surface 32 of the cornea 30 may then be placed on the cornea 30 along with fluorescein dye. The spacial extent and topography of the central flat surface 32 may then be established by carefully examining the fluorescent pattern (not shown) of the fluorescein containing tear fluid between the test lens and the cornea 30 as the test lens is manipulated on the cornea 30. The radius of curvature of the surface of the cornea 30 surrounding and proximate to the central flat surface 32 is also measured utilizing any known technology such as keratometry in some or all meridians. The patient is also refracted to determine the prescription required to increase the visual acuity of the eye.

Referring now to FIGS. 4a–4d and 5a–5c, a contact lens 10 according to the present invention may be fabricated beginning with a standard contact lens blank 60 of type known in the art. The blank 60 has a generally cylindrical shape and a first circular end 62, a second circular end 64 and a generally cylindrical outer surface 66 extending therebetween. The contact lens blank 60 is preferably formed from a hard but machinable transparent plastic material such as polymethylmethacrylate, a copolymer of methylmethacrylate with at least one other ethylenically polymerizable monomer, or an oxygen permeable silicone polymer. Other suitable materials known in the art may also be used.

Figure 4A:
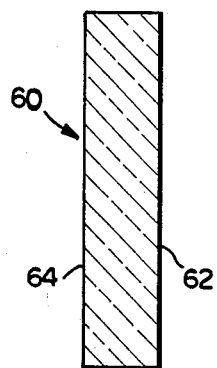
FIGS. 4a-4c are sectional views illustrating the fabrication of the posterior surface of the lens of FIGS. 1-3.
Figure 4B:
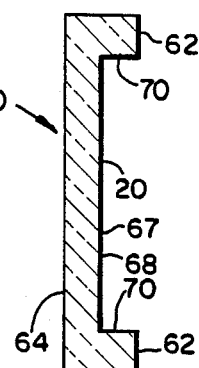

As illustrated in FIG. 4b a contact lens button or blank 60 having a diameter of, for example, approximately 12.7 millimeters, is mounted in an optical lathe (not illustrated) or other suitable device for rotation of the blank 60. Using a precision cutting tool, such as a diamond cutting tip on a lathe with a radius turning attachment, a generally cylindrical central bore 67 is cut in the first circular end 62 of the lens blank 60. The bore 67 has a generally flat, circular first interior surface 68 which is bounded at its periphery by a generally annular second interior surface 70 extending peripendicularly from the first anterior surface 68. The diameter of the bore 67 is about equal to the diameter of the desired central or first posterior zone 20 of the contact lens 10. The depth of the bore 67 is determined by the desired extension of the finished lens 10 along the cornea parallel to the direction of the optic axis 38, when the lens is positioned on the cornea 30. The depth of the bore 67 must be sufficient to permit the plano lens segment 52 and the peripheral lens segment 54 to be formed from the portion of the lens blank 60 surrounding the bore 67.

Next, unlike prior art lens in which only the anterior surface of the lens is polished, the lens blank 60 is removed from the lathe and the first interior surface 68 is polished to provide the first posterior zone 20 of the lens 10. Polishing may be accomplished in any known manner but preferably by initially mounting the lens blank 60 on a first tool or base member (not illustrated) using pitch, wax, or some other suitable easily removable adhesive. The base member may be a small generally cylindrical brass tool having an interior taper, such as a Brown and Sharp No. 2 taper formed in the center of one of the circular ends of the tool, and a generally flat second circular end on which the uncut second circular end 64 of the lens blank 60 is mounted. The first tool has a diameter which is as least as great as the exterior diameter of the lens blank 60. Mounting the blank 60 on the tool permits the lens blank 60 to be rotated during polishing by mounting the tool in a suitable device for rotating the tool.

A second cylindrical brass tool or lap (not illustrated) having a diameter less than the diameter of the bore 67 is used to polish the first interior surface 67. Polishing compound is applied between the first interior surface 67 and the lap. The lap is rotated or spun using a suitable device such as a polishing spindle (not illustrated) while the first tool is rotated in the opposite direction until the cut marks made by the lathe tool have been removed and the first interior surface 67 has become optically clear. Alternatively, only the lap is rotated while its position on the surface of the blank 60 is varied.

The polishing technique used depends on the type of material from which the lens blank is formed. Standard polishing materials such as silver polish, stannic oxide, white rouge, XPAL, or SILVO abrasive (trademark of R. T. French Co., Rochester, N.Y.) may be used. Standard polishing pad materials such as pellen pads, velveteen, plastic tape, and MOLEFOAM (trademark of Scholl Manufacturing Co., Inc., New York, N.Y.) may be employed.

Figure 4C:
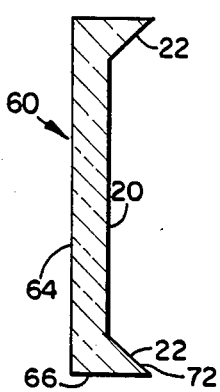

Next, the lens blank 60 is removed from the first tool, for example, by melting the pitch, and the lens blank 60 is remounted in the optical lathe. As illustrated in FIG. 4c a generally annular third interior surface 72 is cut in the lens blank 60. The third interior surface 72 extends radially outwardly a predetermined distance from the first posterior zone 20 of the lens blank 60 and, in the illustrated embodiment, extends all the way to the cylindrical surface 66 of the lens blank 60. The angle (not illustrated) which the third interior surface 72 makes with the first posterior zone 20 corresponds generally to the angle subtended by the central flat surface 32 and a tangent to the surrounding generally normal portion 34 of the cornea 30, the tangent being taken at the midpoint of a radial arc taken along the generally annular portion of the generally normal surface 34 of the cornea 30 which confronts the second posterior zone 22 of the lens 10.

The lens blank 60 is once again removed from the lathe and mounted on the first tool using pitch (not illustrated). The third interior surface 72 is polished using a suitable polishing device. Preferably, a dental spinning tool in which is mounted a pellen pad be employed. Polishing continues until the third interior surface 72 is optically clear and free of lathe cut marks, thus forming the second posterior zone 22 of the contact lens 10.

Figure 4D:
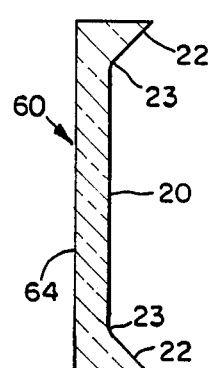
FIG. 4d is a sectional view illustrating the fabrication of a posterior surface of a second preferred embodiment of the present invention having an additional annular posterior zone.

In an alternative embodiment of the present invention illustrated in FIG. 4d, an additional annular posterior zone 23 extends radially outwardly intermediate the first or central posterior zone 20 and the second posterior zone 22. In this embodiment, an additional or fourth interior surface 73 is cut in the lens blank 60 with the lathe before the third interior surface 72 is cut. When polished, the third and fourth interior surfaces 72, 73 form the second and third posterior zones 22, 23 of the lens 10. The multiple annular posterior surfaces are adapted to fit the curvature of the portion of the cornea 30 immediately surrounding and proximate to the central flat corneal surface 32.

In another alternative embodiment (not illustrated) the radius of curvature of the posterior surface 13 of the lens 10 changes continuouly along a portion of the meridan extending from the first posterior surface 20 to the edge 26 of the lens 10. The continuous curvature may be obtained using a numerically controlled optical lathe, by using an analog technique to trace the desired curvature from a master lens, or otherwise.

Once the portion of the posterior surface of the lens has been completed, the lens blank 60 is remounted in the lathe so that the second circular end 64 of provide lens blank 60 is exposed and the blank 60 is cut to give a first exterior surface 74. The diameter of the first exterior surface 74 is the same as the lens blank 60. The curvature of the first exterior surface 74 is made in accordance with the results of the refraction to improve or to correct the vision of the eye 40 on which the contact lens 10 is to be mounted.

The lens blank 60 is then removed from the lathe and mounted using pitch or some other easily removable adhesive on a third tool (not illustrated) similar to the first mounting tool used to hold the lens blank 60 while polishing the posterior surfaces. The top of the third tool is adapted to fit the posterior surface of the contact lens blank 60 in close proximity. The exterior surface 74 is then polished. A fourth tool, such as a small brass lap having a concave surface adapted to parallel the convex anterior surface of the lens blank, and a polishing compound such as pitch, may be used.

Figures 5A, 5B, 5C:
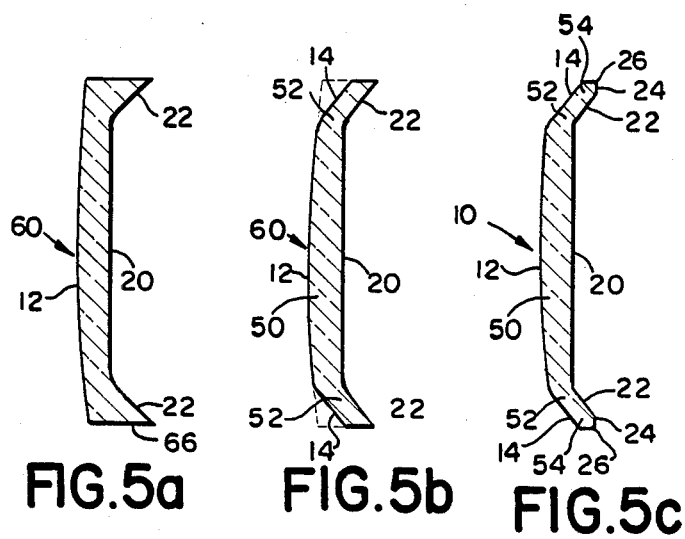
FIGS. 5a-5c are sectional views illustrating the fabrication of the anterior surface and finishing of the posterior surface of the contact lens of FIGS. 1-3.

Next, the lens blank 60 is replaced in the lathe with the anterior surface again exposed and an annular second exterior surface 76, as illustrated in FIG. 5b, is cut with the lathe. The second exterior surface 76 extends radially from the first anterior zone 12 of the contact lens to the cylindrical surface 66 of the lens blank 60 and generally parallels the second posterior zone 22.

Subsequently, the lens blank 60 is removed from the optical lathe and remounted on the third tool (not illustrated) and the second exterior surface 76 is polished using a rotary powered dental tool equipped with a pellen pad (not illustrated) or some other suitable equipment to form the second anterior zone 14 of the contact lens 10. The lens blank 60 is then removed from the third tool, cleaned and inspected.

Finally, the anterior surface of the lens blank 60 is gripped by a suction cup-equipped tool (not illustrated). The posterior side of the lens blank 60, and specifically the portion of the second posterior zone 22 proximate the edge 26 of the contact lens 10, is polished using polishing compound and a radius of curvature tool (not illustrated). The radius of curvature tool has a central circular zone having a radius of curvature corresponding to 10.5 diopters and an annular peripheral zone having a radius of curvature corresponding to 12.25 diopters. As illustrated in FIG. 5c, this final step results in a third posterior or peripheral zone 24 on the posterior surface 13 of the contact lens 10.

Other methods may be used to manufacture the contact lens of the present invention. For example, the contact lens of the present invention may be cast in a preformed mold or spun cast on a supporting preformed surface. As will be apparent to those skilled in the contact lens manufacturing art, other processes may be also employed. For example, the edge 26 of the lens 10 may be formed on the blank 60 using an automatic edging machine.

From the foregoing description it can be seen that the present invention comprises a contact lens for the eye of the patient having a central flat corneal surface, and provides enhanced visual acuity with increased comfort and reduced trauma and fitting problems in comparison with prior art contact lens. In addition, the lens helps to control the diurnal variation in the shape of the cornea of patients suffering from corneal instability. It will be recognized by those skilled in the art that changes may be made to the above-described embodiments of the invention without departing from the broad inventive concept thereof. It is understood therefore, that this invention is not limited to the particular embodiments disclosed, but is intended to cover all modifications which are within the scope and spirit of the invention which is defined by the appended claims.

I claim:

1. A contact lens for the eye of a patient with a cornea having a central surface, the contact lens comprising:

a posterior surface including a generally flat circular first zone having a diameter at least 0.5 mm greater than the greatest dimension of the central corneal surface, the first posterior zone having a radius of curvature at least as small as the radius of curvature of the central corneal surface, a generally annular second posterior zone extending radially beyond the first posterior zone, the second posterior zone having a radius of curvature less than the radius of curvature of the first posterior zone and generally corresponding to the curvature of the corneal surface surrounding the central corneal surface; and an anterior surface including a first generally circular corrective zone for correcting the patient's vision, and a second generally annular zone extending radially beyond the corrective zone and generally paralleling the second posterior zone.

2. A contact lens according to claim 1 wherein the posterior surface further includes a generally annular, peripheral third posterior zone extending radially beyond the second zone, the peripheral zone extending outwardly from the corneal surface to facilitate circulation of fluid between the contact lens and the cornea.

3. A contact lens according to claim 1 wherein the radius of curvature of the first posterior zone is less than the radius of curvature of the central corneal surface.

4. A contact lens according to claim 1 wherein the posterior surface of the contact lens further includes at least one additional generally annular zone intermediate the first posterior zone and the second posterior zone, the additional zone adapted to closely approach the corneal surface adjacent thereto when the contact lens is positioned on the eye of a patient.

5. A contact lens according to claim 1 wherein the annular width of the second posterior zone is from about 0.05 mm to 1.5 mm.

6. A contact lens according to claim 1 wherein the diameter of the first anterior zone of the lens is about the same as the diameter of the first posterior zone.

7. A contact lens according to claim 2 wherein the first posterior zone and first anterior zone comprise opposing surfaces of a corrective lens segment adapted for correcting the vision of the patient, the second posterior zone and the portion of the second anterior zone opposite to the second posterior zone comprise opposing surfaces of a generally annular plano lens segment, and the third posterior zone and the portion of the anterior zone opposing the third posterior zone comprise a generally annular peripheral lens segment.

8. A contact lens according to claim 1 wherein the reciprocal of the radius of curvature of the second posterior zone is about 1.5 diopters greater than the reciprocal of the radius of curvature of the first posterior zone.

9. A contact lens according to claim 2 wherein the reciprocal of the radius of curvature of the third posterior zone is greater than the reciprocal of the radius of curvature of the second posterior zone.

10. A contact lens according to claim 9 wherein the reciprocal of the radius of curvature of the third posterior zone is about 3.0 diopters greater than the reciprocal of the radius of curvature of the second posterior zone.

11. A contact lens according to claim 1, wherein the cornea has a generally flat central surface resulting from surgery, the central surface being surrounded by generally normal cornea, the first posterior zone of the lens having a diameter at least 0.5 mm greater than the greatest dimension of the flat corneal surface and wherein the second posterior zone of the lens has a radius of curvature generally corresponding to the curvature of the normal corneal surface.

12. A method of making a contact lens for the eye of a patient with a cornea having a central surface comprising the steps of:

establishing the size, position and topography of the central surface of the cornea and the surrounding corneal surface proximate thereto;

refracting the patient to determine the prescription required; and fabricating a contact lens having an anterior surface and a posterior surface, the posterior surface including a generally flat circular first zone having a diameter at least about 0.5 mm greater than the greatest dimension of the central corneal surface and a radius of curvature at least as small as the radius of curvature of the central corneal surface, a generally annular second posterior zone extending radially beyond the first zone, the second zone having a radius of curvature less than the radius of curvature of the first posterior zone and generally corresponding to the curvature of the corneal surface surrounding the central corneal surface, and the anterior surface including a first generally circular corrective zone for correcting the patient's vision, and a second generally annular zone extending radially beyond the corrective zone and generally paralleling the second posterior zone.

13. A method according to claim 12 wherein the fabrication of the contact lens includes the steps of cutting and polishing the zones of the anterior and posterior surfaces of the lens.

14. A method according to claim 12 wherein the lens is fabricated from a generally cylindrical contact lens blank having first and second generally planar circular end surfaces and an exterior cylindrical surface extending therebetween, fabrication of the contact lens including the steps of:

cutting a generally cylindrical bore centered in the first surface of the blank to form a generally circular first interior surface and a generally cylindrical second interior surface in the lens blank;

polishing the first interior surface of the lens blank to form the first posterior zone of the contact lens;

cutting the contact lens blank to form a generally annular third interior surface extending radially outwardly from the first posterior zone;

polishing the third interior surface to form at least a portion of the second posterior zone of the contact lens;

cutting the second surface of the lens blank to form a corrective anterior surface as required to correct the patient's vision;

polishing the corrective anterior surface;

cutting the second surface of the lens blank to form a generally annular anterior surface extending radially outwardly from the corrective zone to the exterior cylindrical surface of the lens blank and paralleling the second posterior zone; and polishing the generally annular anterior surface to form the second anterior zone of the contact lens.

15. A method according to claim 14 wherein the posterior surface of the lens further includes a generally annular, peripheral third posterior zone extending radially beyond the second zone, the peripheral zone extending outwardly from the corneal surface to facilitate circulation of fluid between the contact lens and the cornea, the method further including the step of polishing the first end of lens blank to form the third generally annular posterior zone.

16. A method according to claim 15 wherein the third interior surface extends radially outwardly from the first posterior zone to the exterior cylindrical surface of the lens blank.

17. A method according to claim 15 additionally comprising the steps of cutting and polishing a generally annular fourth interior surface extending radially outwardly from the generally annular third interior surface, whereby the polished third and fourth interior surfaces form the second posterior zone of the contact lens.

18. The method as recited in claim 12, wherein the cornea has a generally flat central surface resulting from surgery and surrounded by generally normal cornea, the first posterior zone of the lens having a diameter at least about 0.5 mm greater than the greatest dimension of the generally flat central corneal surface, the second posterior zone of the lens having a radius of curvature corresponding to the curvature of the generally normal corneal surface.

* * * * *